United States Patent Office 2,873,785
Patented Feb. 17, 1959

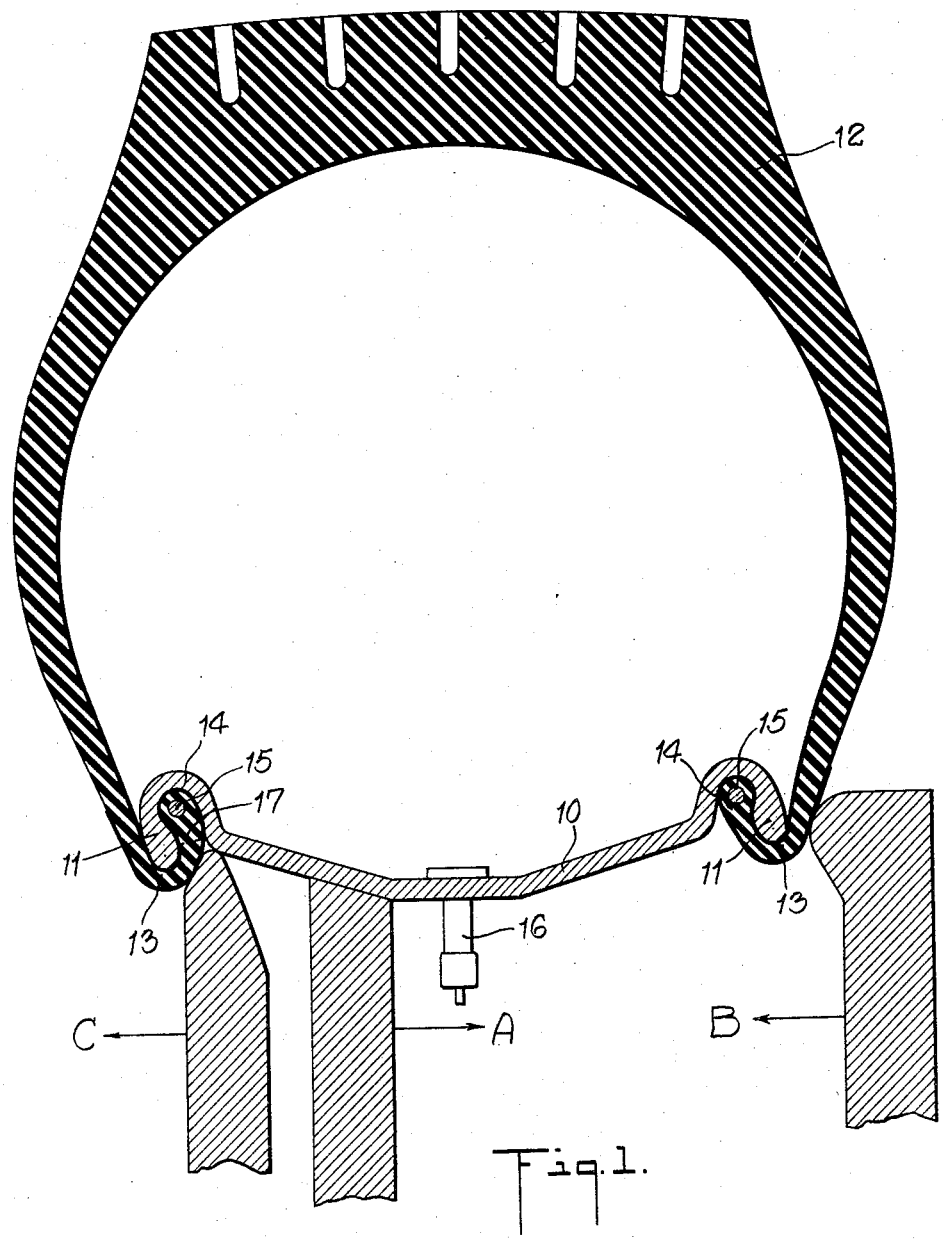

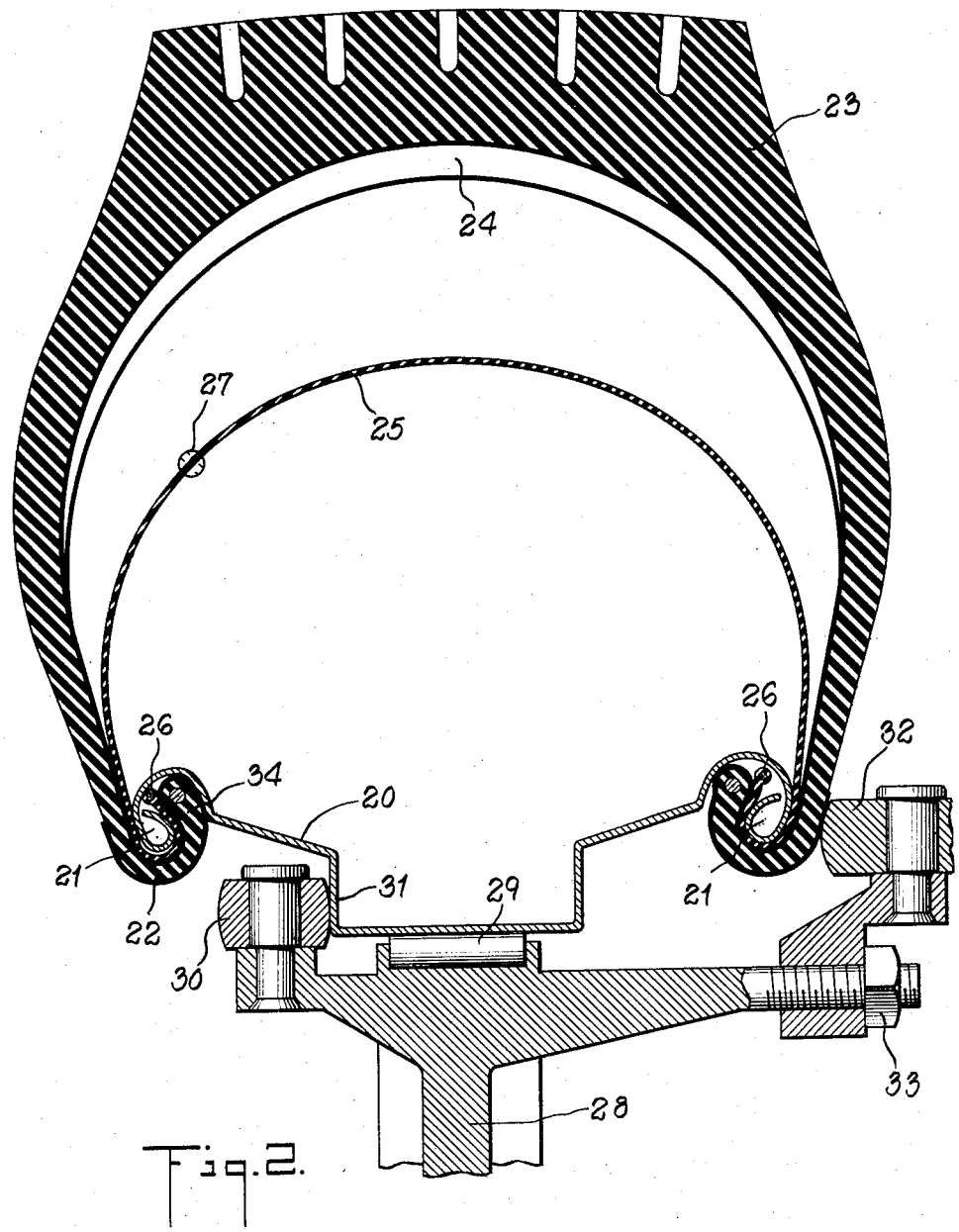

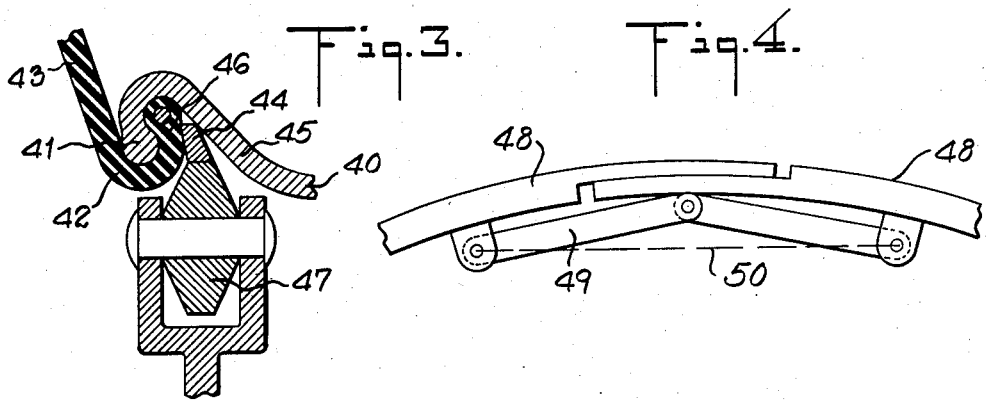
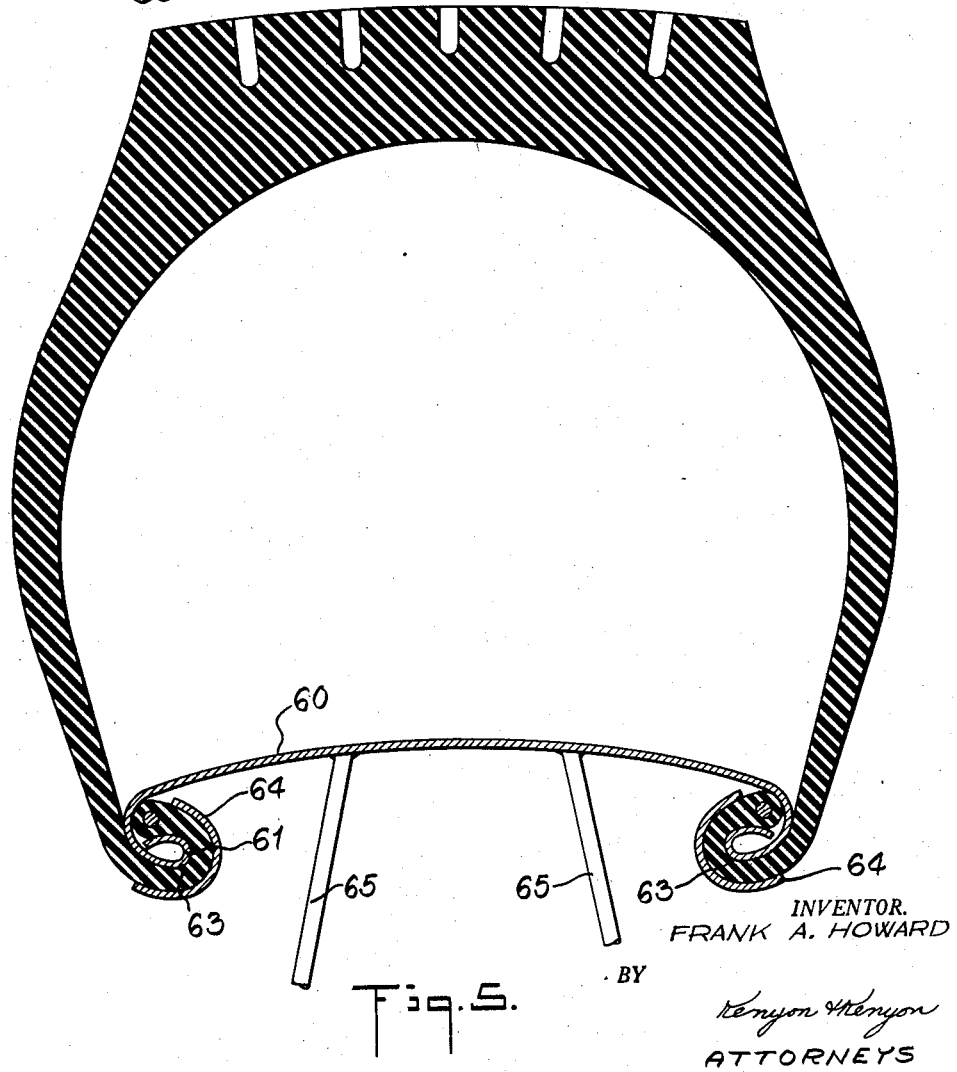

2,873,785

PNEUMATIC WHEEL UNIT

Frank A. Howard, New York, N. Y.

Application August 16, 1954, Serial No. 449,859

6 Claims. (Cl. 152—380)

My invention relates to improvements in pneumatic tires and rims therefor and more particularly to a pneumatic wheel unit comprising an airtight rigid rim having radially inturned side flanges and a U-shaped pneumatic tire the side walls of which terminate in channels which interlock with and embrace these flanges. Means are provided for gripping each edge of the tire side wall against the inner face of the corresponding rim flange to form initially both an airtight seal and an anchorage. Since the tension of the tire side wall, due to the subsequent inflation of the tire, is by this construction applied directly to the bend of the tire margin around the edge of the rim flange which it embraces, both the anchorage and the seal are of the "snubbing" type, in the sense that the forces exerted at the point of initial seal and anchorage on the inside of the rim flange need be only a small fraction of the resultant sealing and anchoring forces created at the edge of the flange when the tire is inflated.

The invention will be fully understood from the following specifications taken in connection with the accompanying drawings in which Figure 1 is a diagrammatic cross section through a rim and tire constructed in accordance with the invention; Figure 2 is a similar section showing a premium-type tire, including a puncture-sealant lining and a safety ring, mounted on a rim of generally similar cross section, and also illustrating the application of spinning rollers to close the rim flanges on the tire margins; Figure 3 is a fragmentary section through a tire margin mounted on a modified form of rim and using a separate locking ring; Figure 4 is a fragmentary side elevation of an optional telescoping joint connection for use with a locking ring of the type shown in Figure 3; and Figure 5 is a cross section through the tire of my invention mounted on a modified form of rim and using U-shaped locking rings.

Referring more particularly to the drawings, the numeral 10 in Figure 1 indicates an airtight rigid rim of relatively heavy cross section which is preformed with smooth channel-shaped margins terminating in continuous inwardly directed flanges 11 which are preferably thickened and rounded on the edges to the conformation shown in Figure 1. Such a rim design may be employed when using light metals of lower tensile strength, such as aluminum or magnesium and their alloys. For combination with such a rim there is used a U-shaped or horseshoe-shaped tire 12 of standard tubeless tire construction except that the side walls terminate in internal channels 13 which interlock with the rim channels and embrace the inturned flanges 11 of the rim. These channels are rubber-faced and pre-formed to the approximate contour shown in Figure 1, and vulcanized in this approximate contour. Preferably the edges are finished by turning one or more of the tire plies around a small central core wire 15 to form an enlarged and stiffened piping 14. For use as a tubeless tire in the form illustrated, the rim is equipped with the usual air inlet valve 16.

To mount the tire on the rim the internal channels 13 are looped around the inturned flanges 11 of the rim, these flanges then being in the open position shown in the right-hand side of Figure 1. To complete the mounting operation the flanges 11 are forcibly pressed inward, as for example by a back-up member A and a pressure member B, as illustrated diagrammatically in Figure 1. When the flanges have been closed to the position shown in the left-hand portion of Figure 1, it will be noted that the tire margins are confined or gripped along a line indicated by the dotted line 17. This line or area of maximum confinement I call the throat of the tire anchorage, and it will be noted that the throat is somewhat smaller in width than is the piping 14 which is preferably used to finish the edges of the tire.

When mounted on the rim in the final position shown in the left-hand portion of Figure 1, it will be seen that the internal channels 13 on the margins of the tire side walls interlock with the rim channels and embrace the inturned flanges 11 of the rim, and that this anchorage may be hermetically sealed at the throat 17 when the tire is mounted by pressure created by forcibly closing the flange 11. When the tire is inflated the radial pull on the tire side walls is applied directly to the rounded edges of the flanges 11, which now perform the same function as the usual wire-reinforced tire beads, carrying the radial pull on the tire side walls and distributing this pull uniformly through the cross section of the side wall. It requires only a small gripping force at the throat 17 to prevent slippage of the tire side walls around the flanges 11. Where the side walls end in an enlarged piping 14, as shown, there may even be a slight initial looseness at the throat 17, since any slippage at all results in increasing the compression at this point. Thus the tire is hermetically sealed and anchored to the rim in the mounting operation and is further sealed by the pressure of the tire lining against the edge of the flange 11 by the inflation pressure. Any slippage of the tire margins around the anchoring flanges results in further perfecting the seal and perfecting the anchorage at the throat 17, if there be any slight initial looseness here.

The tire and rim shown in Figure 1 may be separately manufactured and supplied to the trade for assembly, as is now the common practice, or the tire may be mounted on the rim at the point of production. In this case the tire and rim assembly may be tested both for airtightness and for strength by inflating the tire to some test pressure far above its normal inflation pressure when mounting is completed. The test pressure may then be reduced and the unit shipped at normal pressure. For dismounting the tire there may be employed a pressure member C, applied as shown by the arrow in Figure 1, to forcibly open the rim flanges 11 and release the tire margin at the throat 17. The amount of bending motion or deformation of the hooked margins of the rim necessary to accomplish the mounting and dismounting of the tire is very small and this operation may be performed a number of times for repairs to the inside of the tire or for the mounting of new tires on old rims.

The tire and rim design shown and described above has many inherent advantages over the standard tire and rim design now in common use, among which may be mentioned the following:

(1) No reinforced beads are required, since the rim itself carries the tension on the tire margins created by the inflation pressure.

(2) The difficulties often encountered in making and maintaining a perfect air-tight seal between the usual tubeless tire and its rim are avoided.

(3) The effective or free length of the tire side wall is increased and the walls are able to bellow outwardly in longer and smoother curves under load, thus reducing the bending stresses and heat generation.

(4) Transfer of heat from the tire to the rim by convection, conduction and radiation is improved by the larger tire-rim contact surface and the larger area of rim surface exposed to the interior of the tire.

(5) The tire tread may bottom on the rim, as in running flat or upon impact with a large object, without destructive effect, since the tire side wall curvature under such conditions is quite easy and the supporting contact when the tire bottoms is the relatively large rounded upper surfaces of the rim margins.

(6) The lateral stability of the wheel, especially important at low pressures, is greatly improved as compared with a conventional tire seating freely between external flanges of a rim.

(7) With tires and rims of conventional design it is necessary for both the tire beads and the rims to be produced to reasonably close tolerances to obtain a firm bead seat on the rim. Such close fits or tolerances are not necessary in the new design.

(8) Because the tire is positively anchored to the rim at both margins, it will remain on the rim, even after a blowout at high speeds or in making a turn at high speeds while under-inflated or flat.

In Figure 2 I have illustrated a modified design of rim designated 20, this rim being of relatively thin cross section such as might suitably be constructed of steel or titanium. The inwardly-hooked margins of the rim 20 are pre-formed as re-entrant flanges 21 which are smoothly curved by rolling over the edges of the flanges which the tire channels 22 embrace.

The tire 23 shown in Figure 2 is of the premium type having a puncture-sealant lining 24 beneath the tread portion and may also be equipped with a separate safety diaphragm 25, the margins of which nest inside the channels 22 of the tire and terminate in a piping 26 which may be stiffened with a central wire core. The safety diaphragm 25 has a small opening 27 to permit the tire to be inflated through a single valve, not shown, in the rim. The operation of such a safety ring or safety diaphragm is described in detail in my co-pending application, Serial Number 134,957, now Patent No. 2,811,189.

The tire 23 may be mounted on the rim 20, with or without the safety diaphragm 25, in the manner described in connection with Figure 1. In Figure 2 I have also illustrated, however, a simple flange rolling machine as an alternative means of closing the rim flanges 21 to grip the margins of the tire. This rolling machine may consist of a plurality of radial arms, of which only one is shown at 28. The arms are rotatable within the rim by appropriate means, not shown, and are centered within the rim by rollers 29 which bear upon a cylindrical surface of the rim. Back-up rollers 30 bear against the rim face 31. To close the open flange 21 against the margin of the tire side wall, there is provided an adjustable spinning roller 32 which may be forcibly moved inward against the back-up roller 30 by a nut 33 to bend the rim flange inward. When the central arm 28 is rotated the spinning roller 32 will thus progressively deform or bend the circumference of the flange 21 to close it upon the rim, embracing and gripping the inturned margin of the tire at the narrowest point or throat 34, as illustrated in the left-hand portion of Figure 2. It will be understood that where the optional safety diaphragm 25 is employed, both faces of the margin of this diaphragm, which nests within the hooked margins 22 of the tire, must be coated with rubber of sufficient thickness to form an air-tight seal between the rim flanges 21 and the tire margins 22.

For opening the rim flanges 21 to dismount the tire, there may be used either the pressure members, as illustrated diagrammatically at C in Figure 1, or spinning rollers of appropriate design bearing at the same point and carried by a suitable frame such as the frame 28.

In Figure 3 I have illustrated a modified type of rim design in which the rim 40 has inwardly turned hooked margins 41 to interlock with corresponding internal channels 42 on the margins of the tire side wall 43. In the construction shown in Figure 3, however, the conformation of the rim margins is altered somewhat so that there may be employed to grip the tire margins against the inwardly turned rim flange a detachable or replaceable locking ring 44. This ring seats against a sloping rim surface 45 so that as the ring 44 is forced radially outward it moves axially outward and grips the tire margin at the throat 46.

The ring 44 may be an endless band of malleable metal which is expanded from its initial form to the final form shown in Figure 3 by a set of pressure spinning rollers 47, or, in the alternative, it may be a split ring, as shown in Figure 4, where the ends of the ring, designated 48, telescope and are connected by a toggle linkage 49. Through this toggle linkage the telescoping joint of the ring may be contracted for insertion of the ring and then forcibly expanded to cause the ring to occupy the position shown in Figure 3. The toggle linkage may be self-locking if the two links are capable of moving beyond dead center position, as shown in Figure 4, where the dead center position is indicated by the dotted line 50.

In Figure 5 I have illustrated a further modification of my design in which the rim 60 is outwardly convex and the hooked margins of the rim terminate in rolled-over edges 61 which have center lines at a small angle to the axis of the rim so that the flange edges face one another across the rim. To grip the tire channels 63 against the rolled-over edges of the flanges 61, I may employ another form of locking ring in the form of a U-shaped resilient metal band 64, either endless or split, which embraces the entire assembly at the tire margins. The rings 64 may be pre-formed with a U-gap slightly less than their final opening and are pressed axially outward, which causes them to spring open slightly and grip the curved faces of the tire channels 63. The locking rings 64 are so located as to be well protected from all external contacts and, even though quite thin in cross section, form safe locks to hold the tire margins anchored to the rim flanges. Due to its outwardly convex profile, the rim 60 serves as a broad and durable safety support for the wheel in case of collapse of the tire. This form of rim is well adapted for use with wire wheels for high speed service. The spokes of such a wire wheel are indicated at 65.

While I have shown and described in considerable detail several forms and modifications of my invention, it will be understood that these details are only illustrative and for the purpose of making the invention more clear, and that the invention is not to be regarded as limited to these details or any of them, save in so far as such limits appear within the terms of the appended claims in which it is my intention to claim all novelty inherent in the invention as broadly as is permissible in view of the prior art.

I claim:

1. A pneumatic wheel unit comprising an airtight rigid rim formed of metal capable of being repeatedly deformed by moderate bending beyond its elastic limits without substantial loss of strength, both margins of said rim being turned radially outward and then radially inward to form narrow channels which face radially inward between opposed faces of integral portions of the rim, the edges of the inturned flanges being continuous and concentric with the rim and smoothly rounded in cross section, and in combination with said rim a flexible U-shaped pneumatic tire, the margins of which are turned axially inward and then radially outward to form open channels which embrace the inturned rim flanges and have their own edges embraced between the opposing faces of the flanges, said tire edges being mechanically secured and sealed to the rim by mechanical pressure exerted by an elastic grip between the opposed faces of the rim channels, the tire side wall edges having a terminal portion of greater thickness than the adjacent marginal portion of the tire wall whereby the tire is anchored in said rim.

2. A construction in accordance with claim 1 in which the tire side wall edges terminate in a piping of greater thickness than the adjacent marginal portion of the tire wall, and the opposing faces of the rim channel are curved to form a throat which grips the tire edges along circular lines of contact adjacent the piping.

3. A construction in accordance with claim 1 in which the side wall edges terminate in a piping of greater thickness than the adjacent marginal portions of the tire wall, said piping having a central relatively stiff metallic core, and the opposing faces of the rim channel are curved to form a throat which grips the tire edges along circular lines of contact adjacent the piping.

4. The method of constructing a pneumatic wheel unit which comprises first forming a rim composed of metal capable of being repeatedly deformed by moderate bending beyond its elastic limits without substantial loss of strength, both margins of said rim being turned radially outward and then radially inward to form narrow channels which face radially inward between opposed faces of integral portions of the rim, the edges of the inturned flanges being continuous and concentric with the rim and smoothly rounded in cross section, mounting upon said rim a flexible U-shaped pneumatic tire, the margins of which are turned axially inward and then radially outward terminate to form open channels which embrace the inturned rim flanges and have their own edges embraced between the opposed integral faces of these rim flanges, and applying mechanical pressure axially to the tire wall outside of the inturned rim flanges to deform said flanges and cause them to mechanically grip and seal the inwardly extending marginal flanges of the tire walls between the opposed faces of the rim flanges.

5. A pneumatic wheel unit constructed in accordance with claim 1 in which the edges of the inturned rim flanges are of smaller diameter than the adjacent portions of the rim, whereby it becomes possible to open the said flanges to release the tire margins by applying axially outward mechanical pressure to the axially inward face of the tire margin which embraces the inturned flange, for the purpose of opening the rim channels by deforming the metal thereof sufficiently to release the tire margin which it embraces.

6. A pneumatic wheel unit constructed in accordance with claim 1 and including as a third element an internal safety ring made of flexible air-impervious material and substantially smaller in cross section than the internal cross section of the tire, and having inwardly facing channels on its margins which embrace the inturned rim flanges and are secured and sealed to the rim along with the margins of the tire by mechanical pressure exerted by the elastic grip between the opposed faces of the rim channels.

References Cited in the file of this patent

UNITED STATES PATENTS

| | | |
|---|---|---|
| 477,962 | Robertson | June 28, 1892 |
| 503,660 | Glen et al. | Aug. 22, 1893 |
| 509,164 | Holt | Nov. 21, 1893 |
| 612,254 | Martin | Oct. 11, 1898 |
| 1,885,484 | Shoemaker | Nov. 1, 1932 |
| 1,903,575 | Shoemaker | Apr. 11, 1933 |
| 1,919,910 | Shoemaker | July 25, 1933 |
| 1,949,695 | Shoemaker | Mar. 6, 1934 |
| 2,756,800 | Riggs | July 31, 1956 |

FOREIGN PATENTS

| | | |
|---|---|---|
| 161,410 | Germany | June 30, 1905 |